US008349427B2

(12) United States Patent
Grotefend

(10) Patent No.: US 8,349,427 B2
(45) Date of Patent: Jan. 8, 2013

(54) DYE MIGRATION-RESISTANT HEAT TRANSFER LABEL

(75) Inventor: Alan C. Grotefend, Bloomingdale, IL (US)

(73) Assignee: Illinois Tool Works Inc., Glenview, IL (US)

( * ) Notice: Subject to any disclaimer, the term of this patent is extended or adjusted under 35 U.S.C. 154(b) by 369 days.

(21) Appl. No.: 12/492,862

(22) Filed: Jun. 26, 2009

(65) Prior Publication Data

US 2010/0028587 A1 Feb. 4, 2010

Related U.S. Application Data

(60) Provisional application No. 61/085,164, filed on Jul. 31, 2008.

(51) Int. Cl.
*B32B 9/00* (2006.01)
*B32B 7/12* (2006.01)

(52) U.S. Cl. ...... 428/40.1; 428/40.2; 428/343; 428/352; 428/354

(58) Field of Classification Search ................. 428/40.1, 428/40.2, 343, 346, 352, 354; 106/31.27, 106/31.6, 486, 487
See application file for complete search history.

(56) References Cited

U.S. PATENT DOCUMENTS

| | | | |
|---|---|---|---|
| 5,972,481 | A | 10/1999 | Stein et al. |
| 6,030,438 | A | 2/2000 | Erdtmann et al. |
| 6,099,944 | A | 8/2000 | Laprade et al. |
| 6,510,788 | B1 | 1/2003 | Norheim |
| 6,646,026 | B2 | 11/2003 | Fan et al. |
| 6,846,532 | B1 | 1/2005 | Bensur |
| 7,014,895 | B1 | 3/2006 | Grotefend et al. |
| 7,021,549 | B2 | 4/2006 | O'Rell et al. |
| 7,217,756 | B2 | 5/2007 | Hu et al. |
| 2002/0062761 | A1 | 5/2002 | Odaka |
| 2005/0136227 | A1 | 6/2005 | Baldwin et al. |
| 2005/0136229 | A1 | 6/2005 | Baldwin et al. |
| 2006/0204690 | A1 | 9/2006 | Gibson et al. |
| 2008/0063863 | A1 | 3/2008 | Colella et al. |

OTHER PUBLICATIONS

Barrier Enhancement Using Additives by Peter Maul, President, Nancor Incorporated (Pira International Conference, Brussels, Dec. 5-6, 2005).

International Search Report for PCT/US09/50034 dated Sep. 16, 2009.

"Nanoclay and Modified Nanoclay as Sorbents for Anionic, Cationic and Nonionic Dyes" by Yiqi Yang et al, Textile Research Journal, Aug. 1, 2005.

*Primary Examiner* — Patricia Nordmeyer

(74) *Attorney, Agent, or Firm* — Levenfeld Pearlstein, LLC

(57) ABSTRACT

A dye migration-resistant heat transfer label for application to various fabrics includes a carrier web, a release coat applied to the carrier web and a composition including ink(s) and/or adhesive applied to the release coat. Inks and/or adhesive containing nanoclay are printed and dried to form a storable film on the carrier web. The composition is heat transferred to the fabric and the carrier web is removed. A method for making the label and a method for marking an item are also disclosed.

11 Claims, 1 Drawing Sheet

DYE MIGRATION-RESISTANT HEAT TRANSFER LABEL

CROSS-REFERENCE TO RELATED APPLICATIONS

This application claims the benefit of priority of Provisional U.S. Patent Application Ser. No. 61/085,164, filed Jul. 31, 2008, entitled "DYE MIGRATION-RESISTANT HEAT TRANSFER LABEL".

BACKGROUND OF THE INVENTION

The present invention relates to heat transfer labels. More particularly, the present invention relates to heat transfer labels for application of indicia to various fabrics to provide indicia that resists the migration of dye from the fabric through the indicia.

Labels are in widespread use in the textile industry. For example, labels are used to transfer indicia formed from ink onto many fabrics for cleaning instructions, sizes, fabric composition, and decoration to name just a few. Typically, labels include thermoplastic inks and/or adhesives that are heat-activated to adhere to fabrics. Heat transfer labels have replaced sewn-on patches in many fabric applications, especially for tee shirts and under garments.

In many instances, the fabric contains a dye that migrates or bleeds and can stain adjacent fabrics or indicia. Often these dyes migrate or bleed through the applied indicia and stain the indicia color(s). White indicia are especially susceptible to dye staining. Therefore, the indicia of a label must be able to resist the migration of dye from the fabric through the indicia after the indicia are applied to the fabric.

In order to achieve dye migration-resistant indicia, it is often necessary to incorporate one or more additional "barrier prints" between the indicia layer and the fabric, such as activated carbon or extender pigment with a platelet structure like talc, clay, or mica. Additional prints, however, not only add to the cost of the indicia, but also act as a temporary fix by postponing the dye migration rather than eliminating dye migration.

Accordingly, there is a need for a high quality heat transfer label that is highly resistant to the migration of dye from a substrate without the need for additional barrier prints. Desirably, such a label is easily made (e.g., printed), using readily commercially available materials. More desirably, raw materials used to make the indicia are approved for use on fabrics. Most desirably, such a label is stable and has a prolonged shelf life.

BRIEF SUMMARY OF THE INVENTION

A dye migration-resistant heat transfer label for application to an item or fabric ("substrate") includes a carrier web, an optional release coat applied to the carrier web, and a nanoclay composition to resist dye migration. Nanoclay is added to ink(s) of the indicia and/or to the adhesive applied to the heat transfer label. The nanoclay composition, whether mixed in the ink or the adhesive, is dried to form a storable film on the carrier web and is transferred to the substrate using a heat transfer process, such as hot stamping. The temporary carrier web is removed after the indicia of the label are transferred to the substrate.

Nanoclay acts as a sorbent for dye in the substrate to be labeled. The nanoclay absorbs the dye that migrates from the substrate and prevents the dye from bleeding or migrating into the indicia. A preferred composition includes nanoclay in both the ink(s) and the adhesive.

The ink(s) is/are formulated with an organic solvent. In this manner, the label is printed with the ink/nanoclay composition and dried by driving the solvent off, forming a film. The heat transfer label can be stored for a prolonged period of time.

Nanoclay may be added to the adhesive, in addition to or in lieu of adding the nanoclay to the ink of the indicia, without diminishing its bonding or adhesive properties. The adhesive for a heat transfer label includes a powdered resin dispersed in resin solution, solvent or water, and nanoclay. The adhesive is printed and dried over the ink(s) or the powdered adhesive can be spread over the wet ink and dried with heat to form a storable film on the carrier web.

A method of making the labels and a method of marking an item with indicia from a hot stamp label are also disclosed.

These and other features and advantages of the present invention will be readily apparent from the following detailed description, in conjunction with the claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
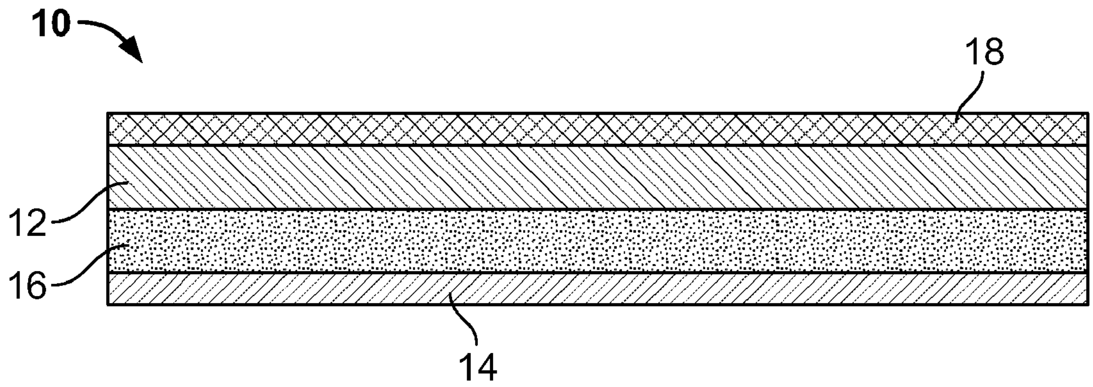
FIG. 1 is a cross-sectional view of a label made in accordance with the principles of the present invention, the label being shown as formed on a carrier or web.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

In the present disclosure, the terms article, item, object, and product are used interchangeably to describe something that is produced that has commercial value and is, for example, an item that is the subject of a commercial transaction.

Figure 2:
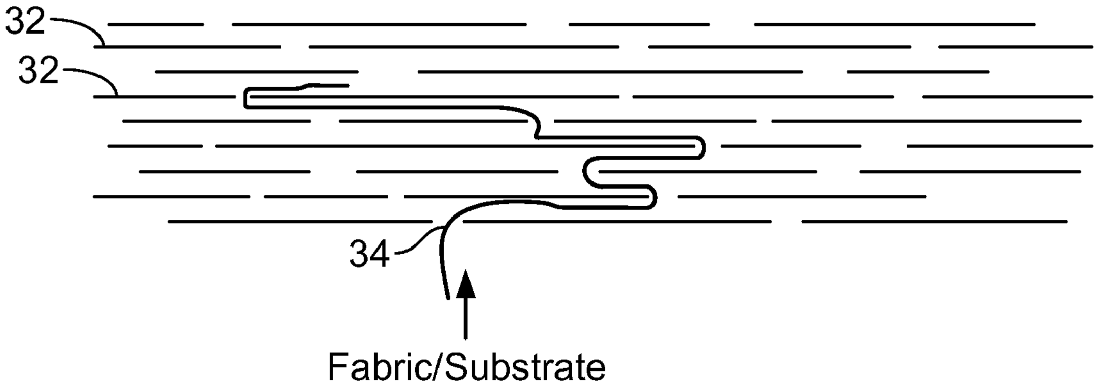
FIG. 2 is a diagram of the nanoclay platelet structure and the tortuous path migration of dye.

Referring to FIGS. 1 and 2, a heat transfer label 10 is accordance with the present invention is formed from a solvent-borne ink 12 printed on a temporary carrier film or paper 14. An adhesive layer 18 may be applied to the carrier film and ink. In addition, an optional release layer 16 may be applied to the temporary carrier layer 14, and the one or more solvent borne inks 12 are applied to the release layer 16 on the carrier film 14. The ink 12 may be air-dried onto the carrier film, such as a non-blocking film. The labels may be capable of being stored for prolonged periods, for example, at least one year, without any degradation in ink 12 quality or transfer capability.

The ink 12 and/or the adhesive 18 in the present invention contain nanoclay. The nanoclay acts as a sorbent for dye in the substrate to be labeled, thus, preventing dye in the substrate to be decorated from migrating and staining the ink 12 used to print the indicia. The type of clay generally referred to as nanoclay is Montmorillonite clay, the most common member of the smectite clay family. Nanoclays such as Nanomer 1.28E, 1.34TCN and others are available commercially from Nanocor Inc., a subsidiary of AMCOL International Corporation. Nanoclays such as CLOISITE 30B, 93A and others are also available from Southern Clay Products, a subsidiary of Rockwood Specialties, Inc.

Nanoclay has a unique platelet structure featuring one dimension in the nanometer range such that the dimensions in two directions far exceed the width. The nanoclay, thus, has a sheet-like structure. Surface modification of nanoclay through onium ion modification or ion-dipole interaction promotes nanoclay compatibility with resins and enables dispersion of nanoclay in resin matrices while enhancing the nanoclay's immiscibility in water. Thus, adding nanoclay to the ink and/or adhesive of the transfer label enables the transfer label to resist bleeding of color from an object or substrate to which it is applied.

Various inks, such as plastisol inks, can be heat sealed to fabric without an adhesive. Accordingly, in one embodiment, heat transfer labels can be created with nanoclay in the ink alone, where no separate adhesive is present. Nanoclay in the ink absorbs dye from the fabric at the interface of the ink and fabric. The nanoclay is dispersed throughout the ink in very tiny platelets 22 that inhibits the dye from penetrating through to the top of the ink 12 where it would be visible. The large surface area of the nanoclay (750 square meters per gram of nanoclay), combined with the small, one nanometer thickness of the nanoclay platelets, provides a tortuous path, illustrated generally at 24, for the dye to travel to penetrate to the top of the relatively thick print of ink 12, which can be 14 microns or 14,000 nanometers thick as shown in FIG. 2.

In another embodiment, nanoclay is present in the adhesive alone. Again, the enormous surface area of 750 square meters per gram of nanoclay, combined with the one nanometer thickness of the nanoclay platelets, provides a tortuous path, indicated generally at 24 in FIG. 2, for the dye to try and penetrate to the top of the adhesive layer, from the fabric to the top of the relatively thick print of ink 12 at 14 microns or 14,000 nanometers. In another embodiment, nanoclay is present in both the dye and the adhesive. It will be apparent to those skilled in the art that having nanoclay in both the ink and adhesive is as effective, if not more so, than applying the nanoclay to one alone. Thus, resistance to dye migration is also effective when the nanoclay is present in the dye or adhesive separately, or in both together.

In addition to the nanoclay, the composition of the ink 12 includes one or more resins including, but not limited to, acrylic, cellulose esters, polyamide, polyester, vinyl chloride copolymer, polyisocyanates or polyurethane. Suitable resins include ESTANE 5703 and other thermoplastic polyurethanes from Noveon, Inc., UCAR VAGH and other copolymers from Dow Chemical Co., CAB-381-20 and other cellulose esters from Eastman Chemical Co., DESMOPHEN C 1200 and other polyester polyols from Bayer Material Sciences, Desmodur N-75 aliphatic polyisocyanate from Bayer Material Sciences and other polyisocyanates as well as acrylic and polyamide resins from various manufacturers and suppliers.

The solvent-borne inks 12 contain a wetting agent capable of producing a uniform deposit of ink 12 on the silicone-coated temporary carrier film 14. The wetting agent alleviates the need for a wax release layer. Suitable wetting agents include silicone-silica blends such as TEGO FOAMEX N®, which is commercially available from Degussa Goldschmidt of Hopewell, Va.

In addition, colorants are added to the ink. Colorants useful in the present formulation of ink include dyes, organic pigments and inorganic pigments. Rutile modification of titanium dioxide is a preferred white pigment to attain optimum opacity.

An adhesive (with or without the nanoclay) generally includes one or more powdered resins including polyamide, polyester, and polyurethane. Suitable polyamide resins include GRILTEX 1A and other polyamides from EMS-GRILTECH, a unit of EMS-CHEMIE, as well as UNEX PA T11 and other polyamides from DAKOTA COATINGS N.V. Suitable polyester resins include GRILTEX 6E and other polyesters from EMS-GRILTECH and UNEX PES T6 and other polyesters from DAKOTA COATING N.V. Suitable polyurethane resins include UNEX 4529 and other polyurethanes from DAKOTA COATINGS N.V. It will be appreciated that the examples given of suitable compositions are for explanatory purposes and is not an exhaustive list and should not be taken to limit the present invention.

The adhesive powder resin can be dispersed in resin solution, solvent, or water prior to printing. Suitable resins for resin solution include IROSTIC 8304 HV and KRYSTALGRAN PN03-214 thermoplastic polyurethanes from Noveon Inc.

An alternative method of applying the adhesive 18 is to spread the dry adhesive powder resin over the wet ink 12. Spreading the adhesive 18 powder over the wet ink 12 avoids the appearance of a halo and minimizes the total number of print stations.

A temporary carrier film 14 is a paper or plastic film. Suitable materials are polypropylene films, as well as polyester films, with polyester being more resistant to heat. Polyester films are available commercially under many trademarks including MYLAR® and MELINEX®. Printing can be conducted in a temperature and humidity controlled environment.

The optional release layer 16 that is disposed between the temporary carrier film 14 and the ink 12 is generally a silicone-coating that allows the ink 12 to "cleanly" transfer to the desired substrate from the temporary carrier film 14 upon application of heat and pressure to the backside of the temporary carrier film 14. Without the release layer 16, portions of the label 10 may not separate from the temporary carrier film 14 and as a result may stick and not fully transfer to the substrate. Those skilled in the art will recognize that there are coatings other than silicone that can be used as the release layer, such as QUILLON, commercially available from E.I. DuPont De Nemours and Co. of Wilmington, Del., as well as various waxes such as paraffin, microcrystalline or polyethylene glycol.

Printing methods for the present label include flexo, gravure, and screen printing. Gravure generally requires long runs due to the high cost of cylinders. Flexo and gravure both use solvents with much lower boiling points than screen printing, and screen printing provides the thickest ink deposit.

Labels were prepared and applied to an item in accordance with the present invention, wherein nanoclay was mixed with both the ink and the adhesive. A white ink was formed composed of a resin solution (formulated from 36.73 percent by weight ethyl 3-ethoxypropionate, 4.51 percent by weight cyclohexanone, 4.61 percent by weight Estane 5703 thermoplastic polyurethane resin and 1.14 percent by weight CAB-381-20 cellulose ester resin), 1.84 percent by weight Nanomer 1.28E nanoclay, white paste (formulated from 18.66 percent by weight ethyl 3-ethoxypropionate, 3.96 percent by weight cyclohexanone, 5.66 percent by weight Estane 5703, and 18.86 percent by weight TIOXIDE TR90 titanium dioxide), 0.86 percent by weight INEOS IJI silica gel, 0.17 percent by weight TEGO Foamex N defoamer and 3.00 percent Desmodur N-75 aliphatic polyisocyanate. An adhesive was formed, composed of resin solution (formulated from 54.23 percent by weight Hi Sol 10 aromatic hydrocarbon solvent and 6.86 percent by weight Irostic 8304 HV thermoplastic polyurethane resin), 4.48 percent by weight Trixene BI7960 blocked polyisocyanate from Baxenden, 1.10 percent by weight Nanomer 1.28E nanoclay and 33.33 percent by weight UNEX 4529 polyurethane powder.

The white ink was screen printed twice through a stainless steel mesh with 270 lines per inch on a 0.004 inch (4-mil) thick polyester film that was coated with a silicone release coating. The adhesive was screen printed through a monofilament polyester mesh with 60 lines per inch over the white ink and dried with forced air.

The label 10 can be transferred to a substrate/item/fabric ("substrate") by itself or in roll form by known heat transfer methods, such as reciprocal hot stamping, transfer by heated roller or the like. Following transfer of ink 12 to a substrate, the temporary carrier film or paper 14 of heat transfer label 10 was removed.

The labels were applied to red dyed polyester fabric with a heated roller. The roller was coated with 0.125 inch to 0.25 inch room temperature vulcanizing (RTV) silicone rubber. The surface temperature of the silicone rubber was 325+/−125 degrees Fahrenheit. The speed of the roller was adjusted from about 6 to 90 feet per minute at a pressure of about 60+/−40 pounds per square inch. A reciprocal hot stamping machine could have been used instead of the heated roller using a dwell time of 1 second to 5 seconds at 325+/−125 degrees Fahrenheit and a pressure of 60+/−40 pounds per square inch. In testing, the ink of the indicia applied to the red polyester fabric resisted migration of the red dye in the polyester fabric to the top of the indicia. No red dye was visible in the ink indicia when viewing the indicia on the fabric.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A dye migration-resistant heat transfer label for application to an item, comprising:

a carrier web;

a release coat applied to the carrier web;

indicia applied to the release coat;

an adhesive; and a nanoclay composition, wherein the nanoclay composition is included in an ink forming the indicia, wherein the nanoclay composition is applied to the carrier web to form a storable film on the carrier web, and wherein the nanoclay composition is configured to be transferred to the item by heat and pressure.

2. The heat transfer label in accordance with claim 1 wherein nanoclay is present in the ink(s) at 0.05-50.0 parts per hundred parts resin.

3. The heat transfer label in accordance with claim 1 wherein the composition comprises one or more resins including acrylic, cellulose ester, polyamide, polyester, vinyl chloride copolymer, polyisocyanate, or polyurethane.

4. The heat transfer label in accordance with claim 1 wherein solvent is present in a concentration of about 10 percent to 90 percent by weight of composition.

5. The heat transfer label in accordance with claim 4 wherein the solvent is an organic solvent, water, or combination of organic solvent and water.

6. The heat transfer label in accordance with claim 1 including plasticizer(s) and/or UV monomer(s) and oligomer (s).

7. The heat transfer label in accordance with claim 1 including a colorant.

8. The heat transfer label in accordance with claim 7 wherein the colorant is a dye, an organic pigment, or an inorganic pigment.

9. The heat transfer label in accordance with claim 1 wherein the adhesive comprises one or more powdered resins including polyamide, polyester, and polyurethane.

10. The heat transfer label in accordance with claim 9 wherein the adhesive powder resin is dispersed in resin solution, solvent, or water prior to printing.

11. The heat transfer label in accordance with claim 9 wherein the adhesive powder resin is spread as a dry powder over the wet ink.

* * * * *